United States Patent
Fukuda et al.

(10) Patent No.: US 8,939,424 B2
(45) Date of Patent: Jan. 27, 2015

(54) SEAT SLIDE DEVICE

(75) Inventors: Jun Fukuda, Fuchu-cho (JP); Yuji Ikeda, Fuchu-cho (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 395 days.

(21) Appl. No.: 13/286,686

(22) Filed: Nov. 1, 2011

(65) Prior Publication Data

US 2012/0145866 A1 Jun. 14, 2012

(30) Foreign Application Priority Data

Dec. 14, 2010 (JP) .................................. 2010-278007
Jun. 17, 2011 (JP) .................................. 2011-134766

(51) Int. Cl.
*F16M 13/00* (2006.01)
*B60N 2/07* (2006.01)
*B60N 2/08* (2006.01)

(52) U.S. Cl.
CPC ............ *B60N 2/0705* (2013.01); *B60N 2/0722* (2013.01); *B60N 2/0818* (2013.01); *B60N 2/0843* (2013.01)
USPC ........ 248/429; 248/430; 248/424; 297/344.1; 296/65.13

(58) Field of Classification Search
CPC .......... B60N 2/0818; B60N 2/08; B60N 2/43; B60N 2/0722; B60N 2/055; B60N 2/4249; B60N 2/0727; B60N 2/07; B60N 2/42; B60N 2/806; B60N 2/085; B60N 2/075; F16M 13/00
USPC ............ 248/429, 430, 424, 503.1; 297/344.1, 297/341, 340, 344.11; 296/65.09, 65.13, 296/65.14
See application file for complete search history.

(56) References Cited

U.S. PATENT DOCUMENTS

| 4,516,811 | A | * | 5/1985 | Akiyama et al. ................ 384/34 |
| 4,720,073 | A | * | 1/1988 | Mann et al. ................... 248/430 |
| 4,828,214 | A | * | 5/1989 | Kanai et al. ................... 248/430 |
| 5,167,393 | A | * | 12/1992 | Hayakawa et al. ........... 248/430 |
| 5,765,798 | A | * | 6/1998 | Isomura ......................... 248/430 |
| 5,806,825 | A | * | 9/1998 | Couasnon ..................... 248/429 |
| 5,829,728 | A | * | 11/1998 | Hoshihara et al. ............ 248/429 |
| 6,478,280 | B2 | * | 11/2002 | Saitoh ........................... 248/429 |
| 6,488,250 | B1 | * | 12/2002 | Munch .......................... 248/430 |
| 6,499,712 | B1 | * | 12/2002 | Clark et al. ................... 248/429 |

(Continued)

FOREIGN PATENT DOCUMENTS

| JP | 2002-225608 | 8/2002 |
| JP | 2004359072 | 12/2004 |
| JP | 2005008065 | 1/2005 |

OTHER PUBLICATIONS

Preissuance Submission by Third Party Issued in Japanese Patent Appl. No. 2011-134766—Aug. 12, 2014.

*Primary Examiner* — Monica Millner
(74) *Attorney, Agent, or Firm* — Gerald E. Hespos; Michael J. Porco; Matthew T. Hespos

(57) ABSTRACT

A seat slide device of the present invention comprises a lower rail (102) and an upper rail (101). The lower rail (102) has a bottom wall (102*b*) and includes a foreign-object catching member (1). The foreign-object catching member (1) has an elastic body (2). A height of the elastic body (2) with respect to a bottom wall (102*b*) of the lower rail (102) is set to become higher than a height of a positioning pin (105) as a protruding object provided inside the lower rail (102) to protrude from the bottom wall (102*b*).

10 Claims, 14 Drawing Sheets

(56) References Cited

U.S. PATENT DOCUMENTS

| | | | |
|---|---|---|---|
| 6,588,722 B2* | 7/2003 | Eguchi et al. | 248/429 |
| 6,860,538 B2* | 3/2005 | Muller et al. | 296/65.13 |
| 7,780,138 B1* | 8/2010 | Lee et al. | 248/429 |
| 7,931,246 B2* | 4/2011 | Brewer et al. | 248/429 |
| 8,049,491 B2* | 11/2011 | Nishide | 324/207.24 |
| 8,052,111 B2* | 11/2011 | Bernhardt et al. | 248/429 |
| 8,075,039 B2* | 12/2011 | Rohee et al. | 296/65.13 |
| 8,172,192 B2* | 5/2012 | Hofmann et al. | 248/429 |
| 8,550,549 B2* | 10/2013 | Baker et al. | 297/188.1 |
| 2001/0024058 A1* | 9/2001 | Saitoh | 297/344.1 |
| 2002/0084683 A1* | 7/2002 | Christopher | 297/344.11 |
| 2004/0084926 A1* | 5/2004 | Muller et al. | 296/65.14 |
| 2004/0124683 A1* | 7/2004 | Matsumoto et al. | 297/344.1 |
| 2004/0222347 A1* | 11/2004 | Oh | 248/424 |
| 2005/0205746 A1* | 9/2005 | Jung et al. | 248/429 |
| 2005/0242604 A1* | 11/2005 | Bonnes et al. | 296/35.1 |
| 2007/0090263 A1* | 4/2007 | Yamada et al. | 248/429 |
| 2007/0170743 A1* | 7/2007 | Kinoshita et al. | 296/65.13 |
| 2008/0048086 A1* | 2/2008 | Kojima et al. | 248/429 |
| 2009/0102261 A1* | 4/2009 | Bernhardt et al. | 297/344.1 |
| 2009/0114793 A1* | 5/2009 | Brewer et al. | 248/429 |
| 2009/0314916 A1* | 12/2009 | Kojima et al. | 248/429 |
| 2011/0024595 A1* | 2/2011 | Oi et al. | 248/429 |
| 2011/0079699 A1* | 4/2011 | Tarusawa et al. | 248/430 |

\* cited by examiner

SEAT SLIDE DEVICE

BACKGROUND OF THE INVENTION

1. Field of the Invention

The present invention relates to a seat slide device for a vehicle, etc., which comprises a lower rail and an upper rail.

2. Description of the Related Art

Heretofore, a seat slide device for a vehicle, etc., which comprise a lower rail and an upper rail, has been widely known. This type of seat slide device is disclosed, for example, in JP 2002-225608A. As illustrated in FIG. 14A, a seat slide device 300 disclosed in JP 2002-225608A comprises a lower rail 301 and an upper rail 302. The lower rail 301 has a bottom wall 301a, a pair of sidewalls 301b, and a pair of bended pieces 301c extending inwardly from respective upper edges of the sidewalls 301b to define an upper opening 301d.

Then, as illustrated in FIG. 14B, the lower rail 301 is mounted on a floor of a vehicle body in such a manner that each of longitudinally opposite ends of the lower rail 301 is fixed to a leg 303 fixed to the floor of the vehicle body, by using a bolt 304 inserted in the lower rail 301 through the upper opening 301d to serve as a fixing member. Further, a sliding piece 302a provided on an upper rail 302 is inserted in a sliding groove 301e defined between associated ones of the sidewalls 301b and the bended pieces 301c, through an interspace 305 defined between the bottom wall 301a and each of the bended pieces 301c of the lower rail 301, to allow the upper rail 302 to be slidingly moved along the longitudinal direction of the lower rail 301.

However, in the seat slide device 300 disclosed in JP 2002-225608A, a head 304a of the bolt 304 is disposed to protrude upwardly from an upper surface of the bottom wall 301a of the lower rail 301 by a length equal to a thickness of the head 304a. Thus, for example, if a foreign object 10, such as a candy or a toy block, intrudes in the lower rail 301 through the upper opening 301d, when the upper rail 302 is slidingly moved along the lower rail 301, the foreign object 10 is likely to be pinched between the head 304a of the bolt 304 and an end face 302b of the upper rail 302 and broken into pieces.

Otherwise, the foreign object 10 intruding into the lower rail 301 is likely to enter the sliding groove 301e through the interspace 305. This is liable to preclude smooth sliding movement of the upper rail 302.

It is an object of the present invention to provide a seat slide device capable of, even if a foreign object intrudes in a lower rail, allowing the foreign object to become less likely to be broken into pieces, or allowing the foreign object to become less likely to hinder smooth sliding movement of an upper rail.

SUMMARY OF THE INVENTION

In order to achieve the above object, the present invention relates to a seat slide device which comprises a long-shaped lower rail formed to have an upper opening and fixed to a floor of a vehicle and an upper rail attached to a seat and slidingly moved along the lower rail where said lower rail has a bottom wall formed in a generally planar shape over an overall length thereof, and a foreign-object catching member provided on an upper surface of the bottom wall to catch a foreign object which falls inside the lower rail through the upper opening. The foreign-object catching member has an elastic body, which allows, during the slide movement of the upper rail, a foreign object caught by the elastic body to be pushed by the upper rail and moved together with the upper rail, while preventing the foreign object from being stopped by hitting against a protruding object protrudingly provided inside the lower rail during the slide movement of the upper rail.

In the seat slide device of the present invention, for example, if a foreign object, such as a candy or a block, intrudes in the lower rail through the upper opening, the foreign object is placed on the elastic body of the foreign-object catching member. Then, when the upper rail is slidingly moved along the lower rail, the foreign object is pushed by the upper rail and displaced in a longitudinal direction of the lower rail together with the upper rail. The elastic body is adapted to prevent the foreign object from being stopped by hitting against a protruding object protrudingly provided inside the lower rail during the slide movement of the upper rail. This makes it possible to eject the foreign object from a longitudinal end of the lower rail to an outside of the lower rail so as to prevent the foreign object from being pinched between the protruding object and the upper rail and broken into pieces.

These and other objects, features and advantages of the present invention will become more apparent upon reading the following detailed description along with the accompanying drawings.

DETAILED DESCRIPTION OF THE PREFERRED EMBODIMENTS

Figure 1:
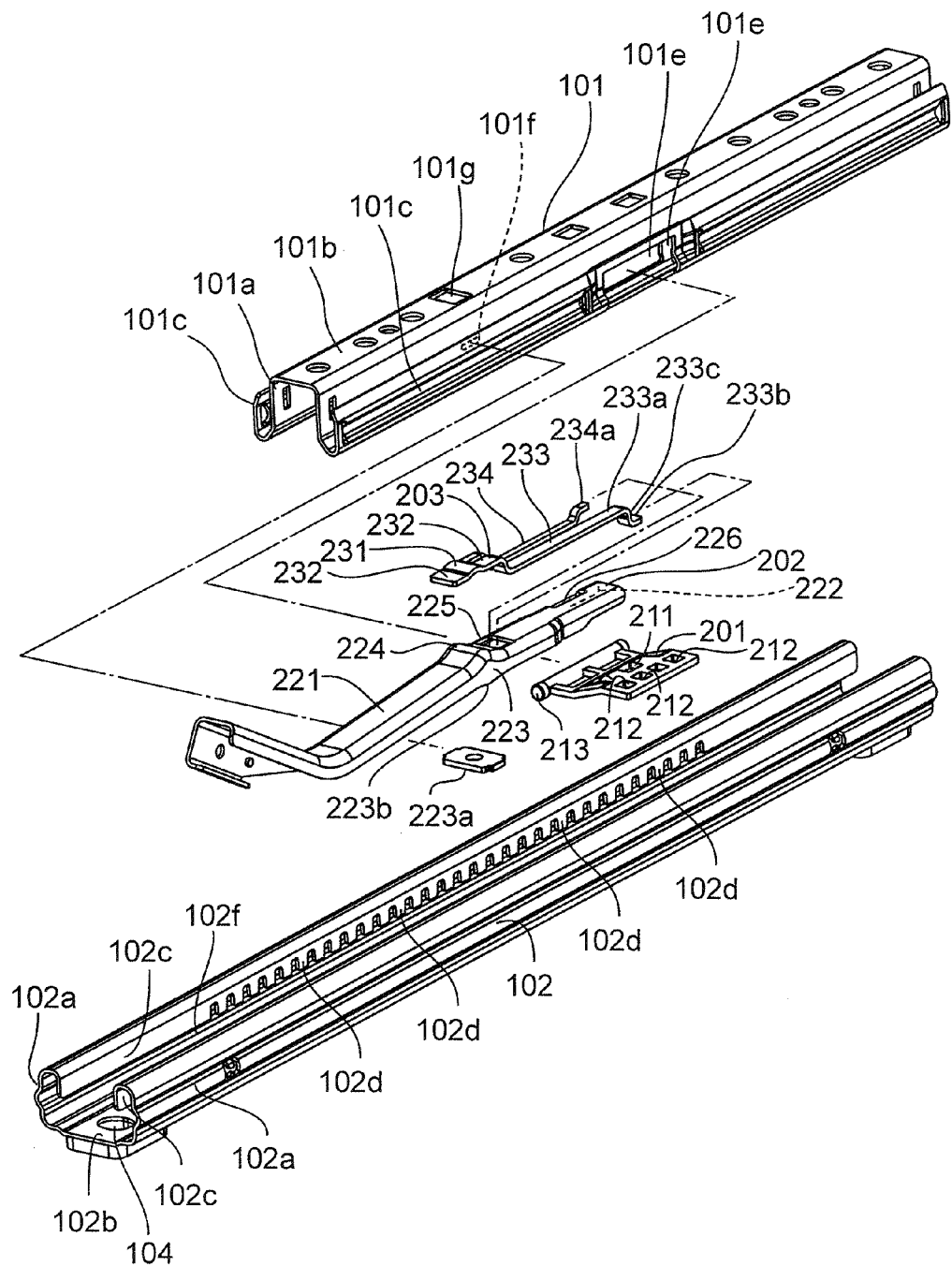
FIG. 1 is an exploded perspective view of a seat slide device according to one embodiment of the present invention.

With reference to the drawings, the present invention will be specifically described based on an embodiment thereof. FIG. 1 is an exploded perspective view of a seat slide device according to one embodiment of the present invention, and FIG. 2 is a top plan view of a lower rail of the seat slide device.

Figure 2:
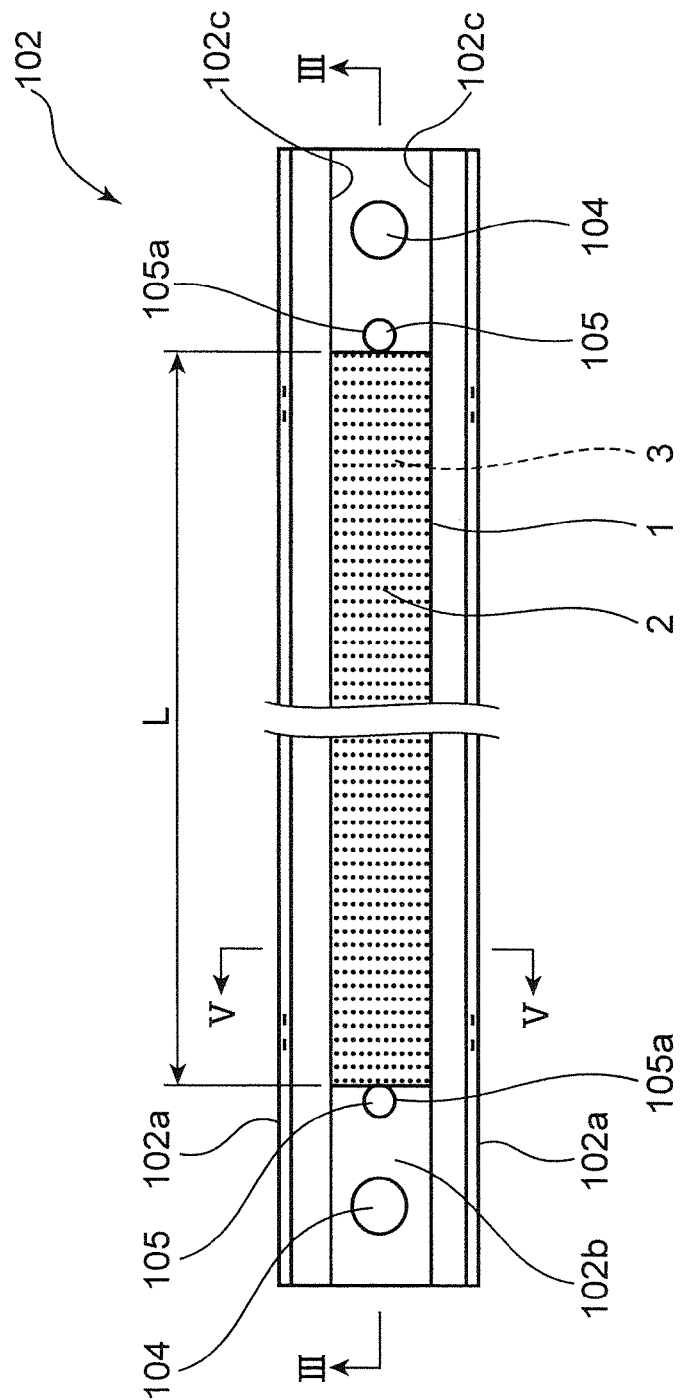
FIG. 2 is a top plan view of a lower rail.
Figure 3:
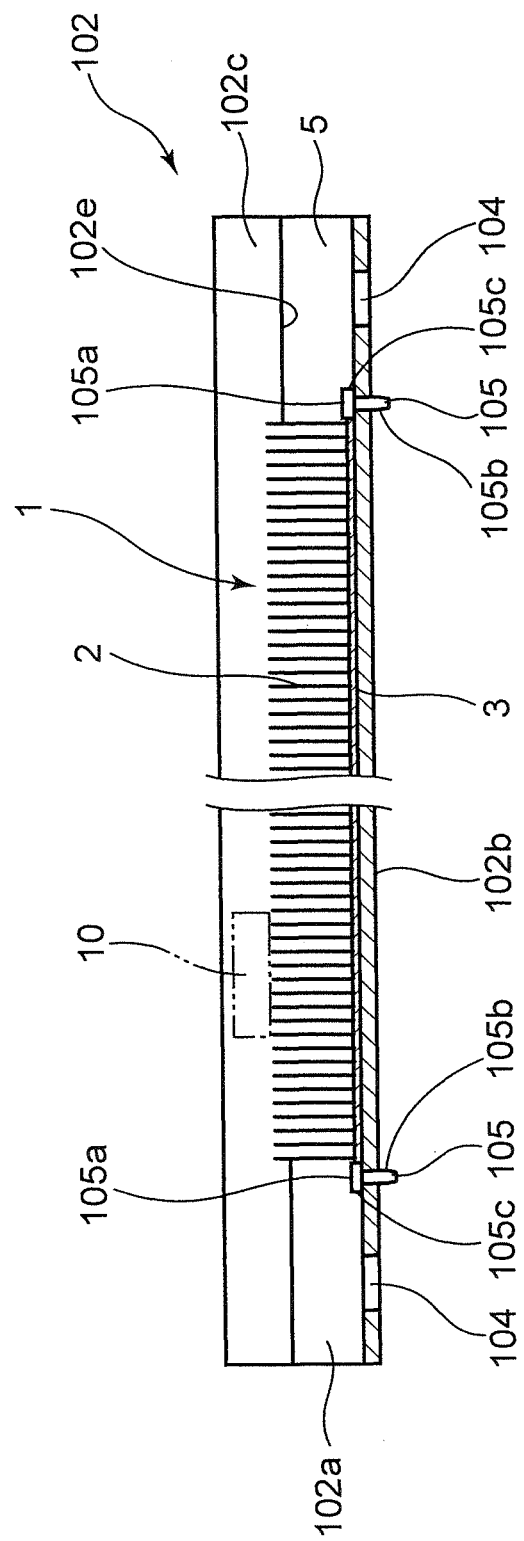
FIG. 3 is a sectional view taken along the line III-III in FIG. 2.
Figure 5:
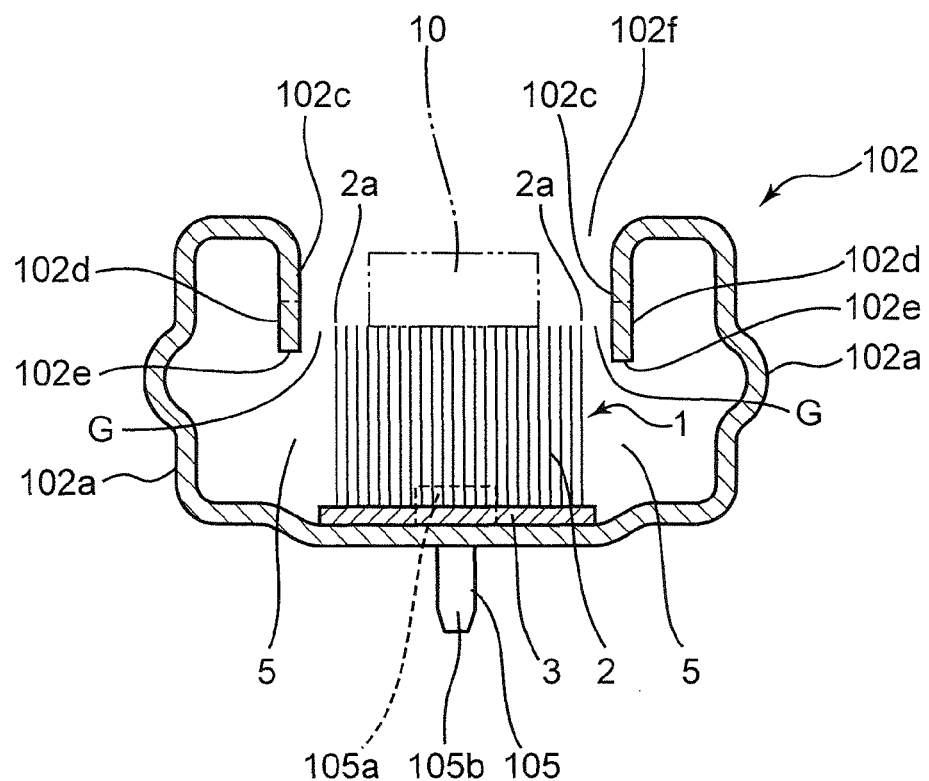
FIG. 5 is a sectional view taken along the line V-V in FIG. 2.
Figure 6:
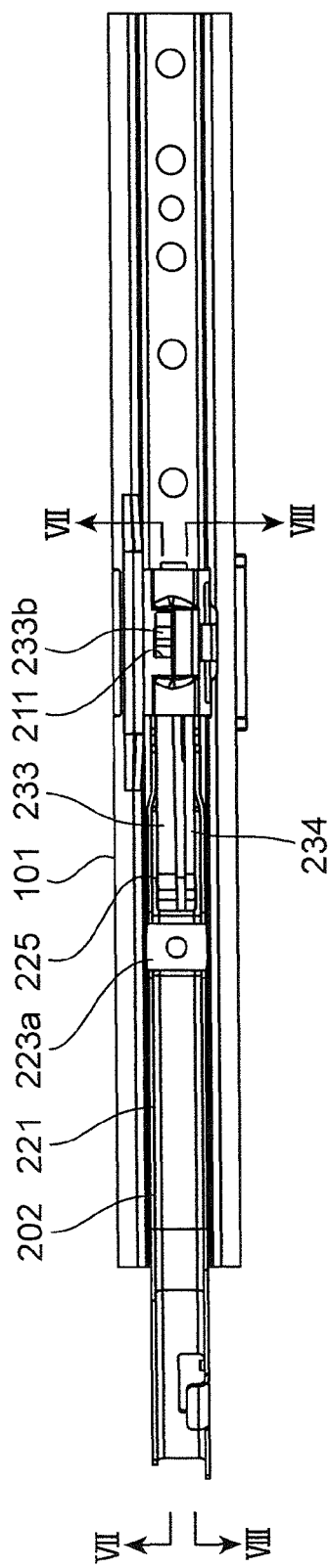
FIG. 6 is a bottom view of an upper rail in a state after a lockable member and an unlock operating member are attached thereto.

FIG. 3 is a sectional view taken along the line III-III in FIG. 2, and FIG. 5 is a sectional view taken along the line V-V in FIG. 2.

The seat slide device according to this embodiment is used in a seat (not illustrated) for a vehicle such as an automobile. As illustrated in FIG. 1, the seat slide device comprises a lower rail 102, an upper rail 101 and a lock/unlock mechanism (201 to 203).

As illustrated in FIGS. 1 to 3, the lower rail 102 has a pair of right and left sidewalls 102a, and a bottom wall 102b. Specifically, the lower rail 102 is formed in a sectionally generally angular-C and long shape having an upper (upward-facing) opening 102f. The lower rail 102 is also formed to have an opening at each of longitudinally opposite ends thereof.

In this embodiment, the lower rail 102 has a pair of right and left inner walls 102c each bended inwardly from an upper end of a respective one of the right and left sidewalls 102a.

Each of the inner walls 102c is formed such that a distal end 102e (see FIG. 3) thereof extends downwardly to a height position approximately half a height of each of the right and left sidewalls 102a, so as to define an interspace 5 between the distal end 102e, i.e., a lower end of the inner wall 102c, and the bottom wall 102b.

Further, as illustrated in FIG. 1, the distal end 102e is provided with a plurality of locking teeth 102d arranged side-by-side along the longitudinal direction. In FIG. 1, the locking teeth 102d appear only in the right (left in FIG. 1) inner wall 102c. It is understood that the left inner wall 102c is also provided with the locking teeth 102d in the same manner.

The bottom wall 102b of the lower rail 102 has longitudinally opposite ends each adapted to be positioned and fixed to a floor by a fixing member.

In this embodiment, the fixing member comprises a fixing bolt (not illustrated) to be used for mounting to the floor, and a pair of front and rear positioning pins 105. In a state after the fixing member is attached to the automobile seat, a part of the fixing member constitutes a protruding object.

Figure 4:
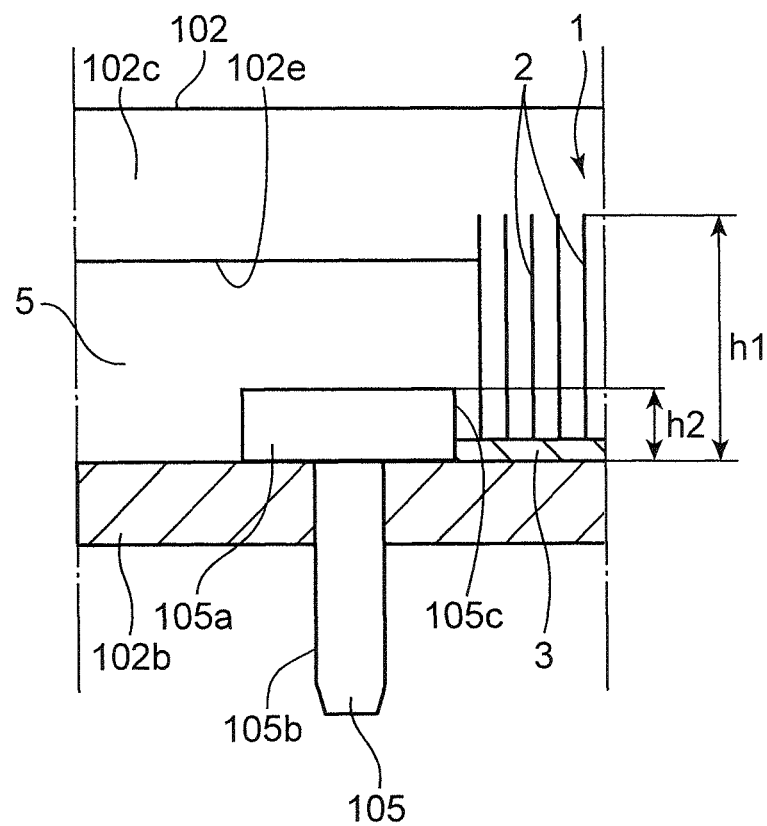
FIG. 4 is a fragmentary enlarged sectional view corresponding to FIG. 2.

The positioning pins 105 are provided as means to position the lower rail 102 with respect to the floor. As illustrated in FIG. 4, each of the positioning pins 105 comprises a head 105a having a vertical surface 105c in an outer peripheral surface thereof, and a shank 105b. In this embodiment, the head 105a consists of a columnar body formed to have the same diameter in its entirety in a direction from a lower end to an upper end thereof, so that the entire outer peripheral surface of the head 105a is formed as the vertical surface 105c.

The positioning pin 105 is fixed to the bottom wall 102b in a posture where the shank 105b is inserted into a through-hole formed in the bottom wall 102b, from the side of an upper surface of the bottom wall 102b. Thus, the head 105a is disposed to protrude upwardly from the bottom wall 102b by a length equal to a thickness thereof to form a protruding object, and the shank 105b is disposed to protrude downwardly from the bottom wall 102b by a given length. In this posture, the vertical surface 105c extends in a direction perpendicular to the upper surface of the bottom wall 102b.

In an operation of mounting the lower rail 102 onto the floor, each of the above positioning pins 105 is inserted into a positioning-pin insertion hole (not illustrated) preliminarily provided in the floor. Thus, the lower rail 102 is positioned with respect to the floor, under a condition that it is set in a given position to allow the longitudinal direction thereof to be aligned with a frontward-rearward direction of the automobile.

Then, in this state, the non-illustrated fixing bolt is inserted into a bolt insertion hole 104 provided in the bottom wall 102b at a position on a longitudinally outer side of each of the positioning pins 105, and attached to the floor. In this manner, the lower rail 102 is mounted on the floor of the automobile in a fixed state.

The lower rail 102 further comprises a foreign-object catching member 1 provided on the upper surface of the bottom wall 102b. In this embodiment, foreign-object catching member 1 comprises an elastic body 2, and a plate-shaped retainer portion 3 which retains the elastic body 2.

The retainer portion 3 is formed to have a length L which is approximately equal to a distance between the pair of front and rear positioning pins 105 of the bottom wall 102b, as illustrated in FIG. 2, and a width which is approximately equal to that of the bottom wall 102b, as illustrated in FIG. 5. The retainer portion 3 is also formed to have a thickness less than that of the head 105a of the positioning pin 105.

The elastic body 2 comprises a plurality of hair-like (cilia-like) elastic protruding pieces. The elastic body 2 is retained by the retainer portion 3, while extending upwardly from an upper surface (second surface) of the retainer portion 3.

As illustrated in FIG. 3, the above foreign-object catching member 1 is fixed onto the bottom wall 102b of the lower rail 102 by fixing means such as an adhesive, under a condition that a lower surface (first surface) of the retainer portion 3 is disposed between the pair of front and rear positioning pins 105 set in the bottom wall 102b. In this state, the elastic body 2 extends to a position slightly above the distal end 102e of the inner wall 102c of the lower rail 102 to narrow a gap G between the distal end 102e and the top & side end of the elastic body 2, as illustrated in FIG. 5. Further, as illustrated in FIG. 4, a height h1 of the elastic body 2 with respect to the upper surface of the bottom wall 102b is set to become higher than a height h2 of the head 105a of the positioning pin 105.

As illustrated in FIG. 1, the upper rail 101 has a pair of right and left sidewalls 101a, and an upper wall 101b. Specifically, the upper rail 101 is formed in a sectionally generally angular-C and long shape having a lower (downward-facing) opening. The upper rail 101 further has a pair of right and left latching pieces 101c each bended outwardly and upwardly from a lower end of a respective one of the right and left sidewalls 101a.

Figure 9:
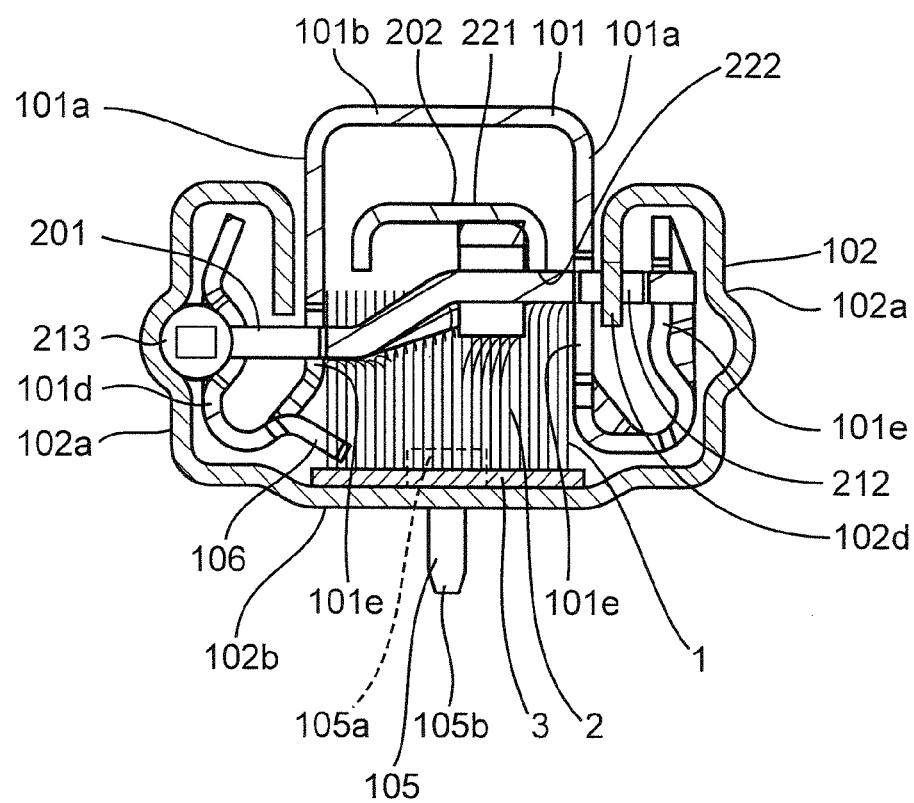
FIG. 9 is a sectional view of the seat slide device in a locked state between the lockable member and locking teeth.

The upper rail 101 is installed such that the upper wall 101b is fixed to a lower end of the automobile seat, and each of the latching pieces 101c is inserted in a space between the sidewall 102a and the inner wall 102c of the lower rail 102 in a longitudinally movable manner, as illustrated in FIG. 9. Thus, the seat fixed to the upper rail 101 can be moved in the frontward-rearward direction by slidingly moving the upper rail 101 along the lower rail 102.

The lock/unlock mechanism will be described below. In this embodiment, as illustrated in FIG. 1, the lock/unlock mechanism comprises a lockable member 201, an unlock operating member 202, and a plate spring 203 as a biasing member. The lockable member 201 is composed of a rectangular plate-shaped body which has a rectangular-shaped through-hole 211 formed in a widthwisely approximately central region thereof to allow an aftermentioned supportable portion 231 of the plate spring 203 to pass therethrough.

The lockable member 201 has a left (in FIG. 1, right) distal (free) end formed with a plurality of (in this embodiment, four) lockable holes 212 adapted to be releasably locked by the locking teeth 102d of the lower rail 102. Each of the lockable holes 212 is formed in a size enough to allow one of the locking teeth 102d to be inserted thereinto. The lockable holes 212 are arranged along the frontward-rearward direction at positions corresponding to the locking teeth 102d.

The lockable member 201 has a right base end provided with a columnar-shaped support shaft 213 adapted to be supported by the upper rail 101. The support shaft 213 will be rotatably supported by the upper rail 101.

More specifically, as illustrated in FIG. 9, each of the right and left latching pieces 101c and the right and left sidewalls 101a of the upper rail 101 is provided with a receiving hole 101e for receiving the lockable member 201. The right (in FIG. 9, left) latching piece 101c of the upper rail 101 is provided with a support portion 101d for rotatably supporting the support shaft 213.

In this embodiment, the support portion 101d is formed on an outer side of the latching piece 101c by inwardly concaving the latching piece 101c of the upper rail 101. Then, the lockable member 201 is mounted to the upper rail 101 under a condition that it is inserted into the respective receiving holes 101e of the right latching piece 101c, the right and left sidewalls 101a and the left latching piece 101c of the upper rail 101, and supported by the support portion 101d.

The above structure allows the lockable member 201 to be attached from outside the latching piece 101c of the upper rail 101, which makes it possible to facilitate the mounting operation for the lockable member 201. In addition, the above structure makes it possible to prevent the support portion 101d or the support shaft 213 of the lockable member 201 from largely protruding outwardly from the latching piece 101c, so as to avoid an increase in size of the seat slide device due to an increase in width of the upper rail 101 and thus the lower rail 102

Figure 10:
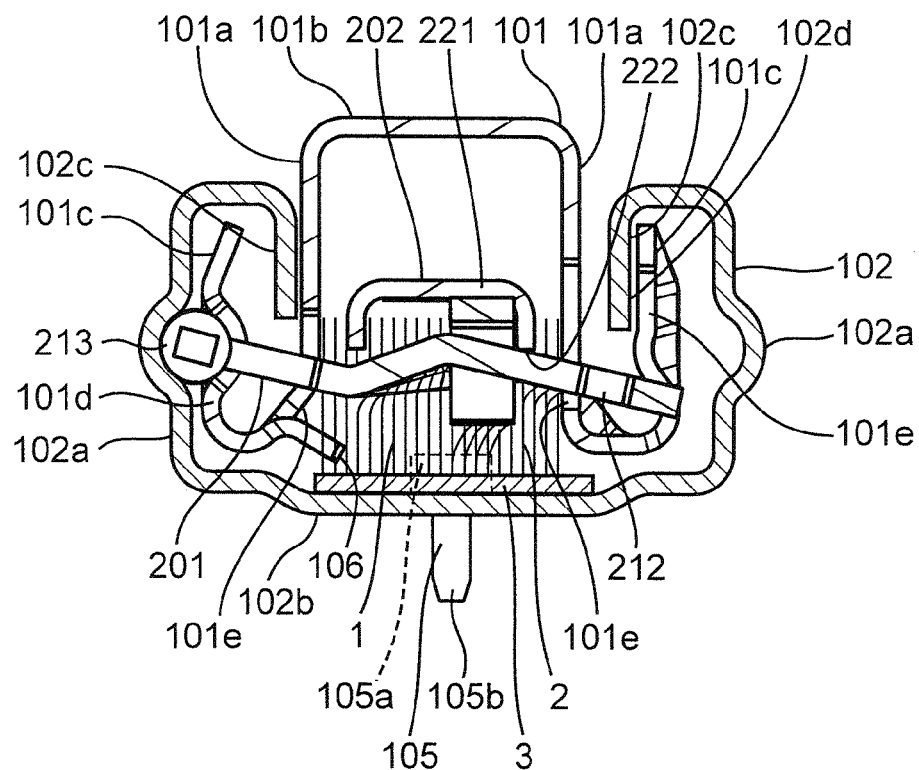
FIG. 10 is a sectional view of the seat slide device in an unlocked state between the lockable member and the locking teeth.

The lockable member 201 is rotatably mounted to the upper rail 101 in the above manner, so that the distal end of the lockable member 201 having the lockable holes 212 becomes movable in an upward-downward direction in a range from a locked position illustrated in FIG. 9 where the locking teeth 102d are inserted into the lockable holes 212 to lock the lockable member 201, to an unlocked position illustrated in FIG. 10 where the locking teeth 102d are pulled out of the lockable holes 212 to release the lock.

Figure 7:
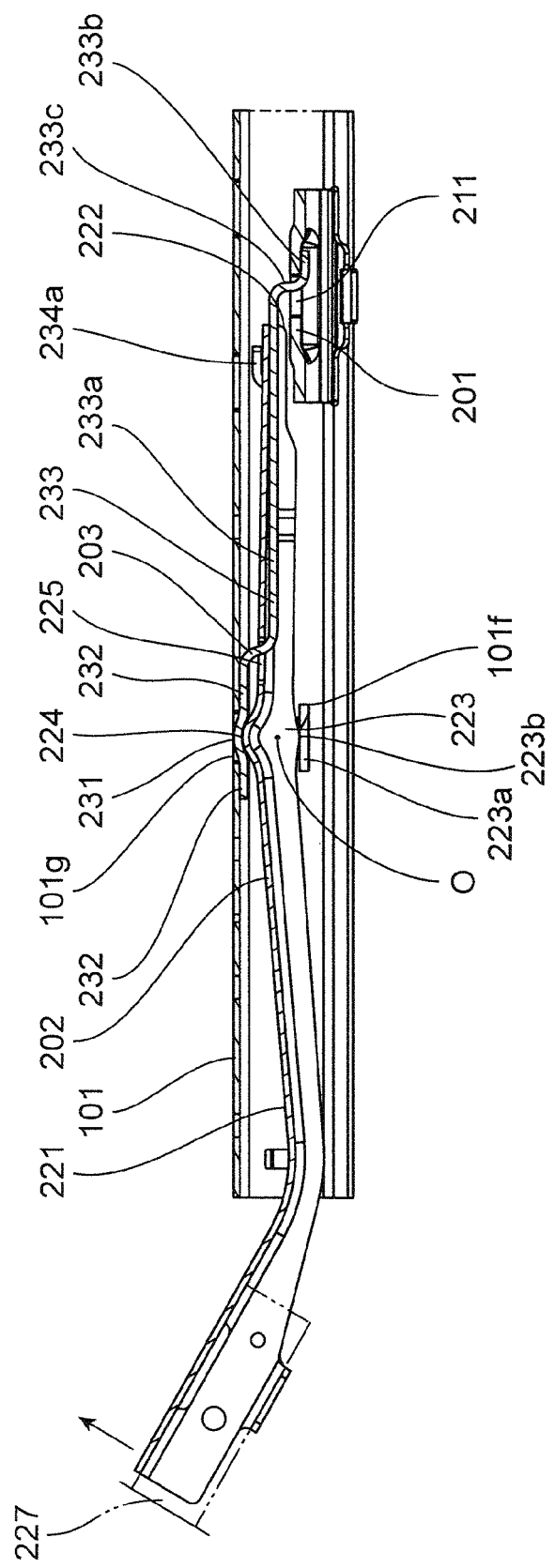
FIG. 7 is a sectional view taken along the line VII-VII in FIG. 6.

As illustrated in FIG. 1, the unlock operating member 202 comprises a long-shaped member body 221. A rear end (one of longitudinally opposite ends) of the member body 221 is provided with a pressing portion 222 (see FIGS. 7 and 9) for pressing an upper surface of the lockable member 201, and a second spring insertion hole 226 for allowing a aftermentioned second arm 234 of the plate spring 203 to pass therethrough. On the other hand, a front end (the other end) of the member body 221 is connected to a grip portion 227 (FIG. 7 illustrated a part of a rear end of the grip portion 227).

Further, a holdable portion 223, a spring support portion 224 and a first spring insertion hole 225 are provided in a longitudinally central region of the member body 221 at positions slightly on the side of the pressing portion 222.

The holdable portion 223 is adapted to be held by the upper rail 101. Specifically, the holdable portion 223 has an arc section 223b formed by allowing a part of a lower end of the member body 221 to protrude downwardly in an arc having an arc center O (illustrated in FIG. 7).

The spring support portion 224 is formed just above the holdable portion 223 to protrude upwardly in an arc having a center at the arc center O of the arc section 223b. As illustrated in FIG. 7, the spring support portion 224 is adapted to support the plate spring 203 while pressing the plate spring 203 against the upper wall 101b of the upper rail 101 from below the plate spring 203.

The first spring insertion hole 225 is formed to penetrate between upper and lower surfaces of the member body 221 so as to allow an aftermentioned first arm 233 and the aftermentioned second arm 234 of the plate spring 203 to pass therethrough.

As illustrated in FIG. 1, the plate spring 203 has a front end (base end) provided with a supportable portion 231 adapted to be supported by the spring support portion 224 of the member body 221, and two rail contact portions 232 provided, respectively, on front and rear sided of the supportable portion 231.

The supportable portion 231 is formed to protrude upwardly in approximate the same arc as that of the spring support portion 224. Each of the rail contact portion 232 is formed in a planar shape, and adapted, when the supportable portion 231 is supported by the spring support portion 224, to be pressed against an inner surface of the upper wall 101b of the upper rail 101.

A portion of the plate spring 203 rearward of the supportable portion 231 is formed in a two-forked structure, specifically, divided into two elongate plate-shaped arms: a first arm 233; and a second arm 234.

The first arm 233 has a biasing piece 233a adapted to bias the pressing portion 222 of the member body 221 upwardly, and a holding piece 233b serving as a holding portion for holding the lockable member 201.

The holding piece 233b is provided on the side of a distal end of the biasing piece 233a through a bended step portion 233c. The bended step portion 233c allows the holding piece 233b to be located below the biasing piece 233a by a given distance.

Then, the holding piece 233b and the biasing piece 233a of the above first arm 233 are inserted to pass through the first spring insertion hole 225 downwardly from above the member body 221. The holding piece 233b penetrating below the member body 221 is further inserted to pass through the through-hole 211 of the lockable member 201 from the side of the upper surface of the lockable member 201, so that it holds the lockable member 201 while hooking a part of a lower surface of the lockable member 201.

As illustrated in FIG. 1, the second arm 234 is formed to have a width less than that of the first arm 233, and a distal end of the second arm 234 is provided with a member-body contact piece 234a adapted to be brought into contact with an upper surface of the member body 221 at a position on a rear side of the second spring insertion hole 226 of the member body 221.

Figure 8:
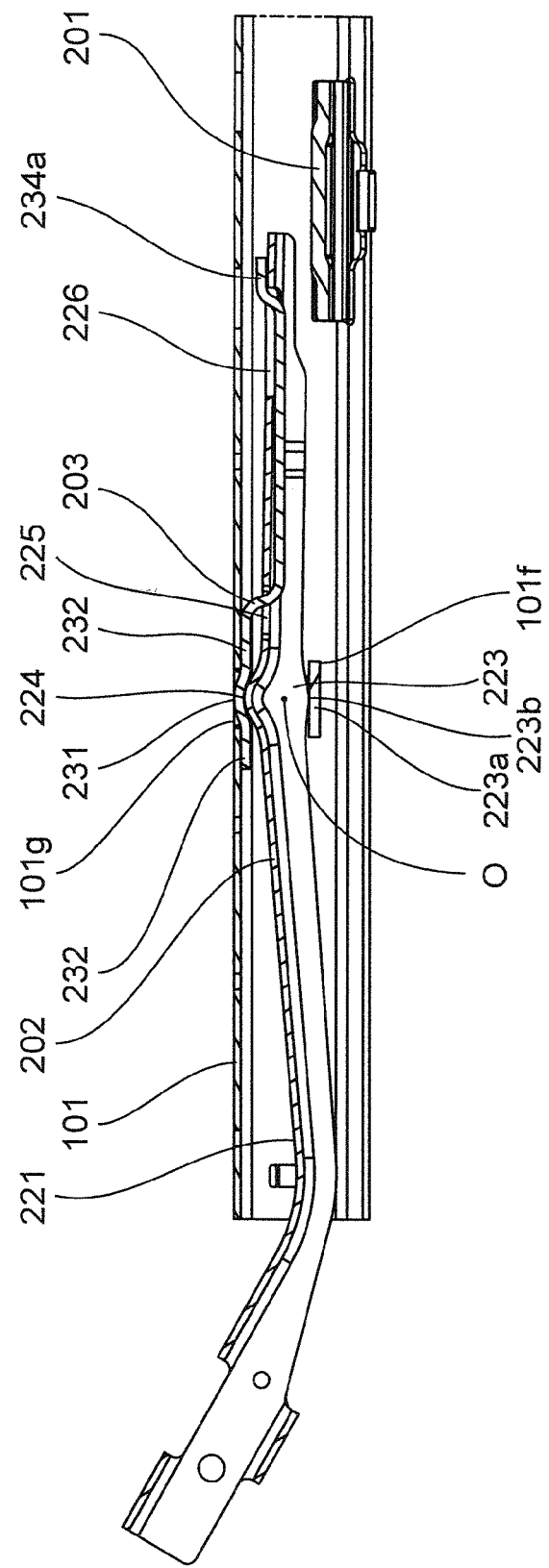
FIG. 8 is a sectional view taken along the line VIII-VIII in FIG. 6.

As illustrated in FIG. 8, the member-body contact piece 234a is inserted to pass through the first spring insertion hole 225 downwardly from above the member body 221 together with first arm 233. Then, the member-body contact piece 234a is inserted to pass through the second spring insertion hole 226 of the member body 221 from below the member body 221, and pulled out toward and brought into contact with the upper surface of the member body 221.

The member body 221 of the unlock operating member 202 having the plate spring 203 and the lockable member 201 attached thereto in the above manner is installed inside the upper rail 101 to allow a longitudinal direction thereof to be aligned with the longitudinal direction of the upper rail 101, and held by the upper rail through a plate-shaped member 223a.

More specifically, as illustrated in FIGS. 7 and 8, in a state after the member body 221 is installed inside the upper rail 101, the plate-shaped member 223a is inserted to pass through a through-hole 101f provided in the upper rail 101. In the above manner, the holdable member 223 is held by the plate-shaped member 223a and the upper wall 101b of the upper rail 101 through the plate spring 203, while allowing the member body 221 to be swingingly moved about the arc center O with respect to the upper rail 101.

Although not illustrated, in a state after the member body 221 is swingingly moved with respect to the upper rail 101, a non-illustrated front end of the grip portion 227 connected to the member body 221 is disposed at a position on a front and lower side of the seat to allow a person seated in the seat to grip and operate the grip portion 227.

In the above state, the supportable portion 231 of the plate spring 203 is inserted into a hole 101g provided in the upper wall 101b of the upper rail 101, and the rail contact portions 232 are pressed against the inner surface of the upper wall 101b of the upper rail 101 from below the upper wall 101b. Thus, the plate spring 203 is fixed to the upper rail 101, and, when the member body 221 is swingingly moved with respect to the upper body 101, the spring support portion 224 is slippingly moved with respect to the supportable portion 231 of the plate spring 203.

As illustrated in FIG. 9, the lockable member 201 held by the holding piece 233b of the first arm 233 is placed in the locked position where it is locked by the locking teeth 102d, according to a biasing force of the plate spring 203 and an elastic force of the elastic body 2 of the foreign-object catching member 1.

In this state, a part of the elastic body 2 is pressed by the lockable member 201 and the member body 221 from thereabove, and curvedly deformed to accumulate an elastic force. Thus, the lockable member 201 is locked by the locking teeth 102d, under a condition that it is applied with the elastic force of the elastic body 2 in addition to the biasing force of the plate spring 203.

An operation of the seat slide device according to this embodiment will be described below. In an operation for releasing the locked state illustrated in FIGS. 7 and 9, for example, a seated person grips the grip portion 227 of the unlock operating member 202 and pulls it upwardly.

Thus, the member body 221 is swingingly moved in a clockwise direction in FIG. 7 against the biasing force of the plate spring 203 and the elastic force of the elastic body 2 of the foreign-object catching member 1, and the pressing portion 222 is swingingly moved downwardly toward the lockable member 201. According to this swinging movement, the biasing piece 233a of the first arm 233 of the plate spring 203 is pressed downwardly, and the holding piece 233b is also moved downwardly.

When the grip portion 227 is further pulled upwardly, the pressing portion 222 pushes the lockable member 201 downwardly, so that the lockable member 201 is disengaged from the locking teeth 102d locked into the lockable holes 212, as illustrated in FIG. 10, i.e., the lock between the lockable member 201 and the locking teeth 102d is released.

Thus, the upper rail 101 is allowed to be slidingly moved along the lower rail 102, and the seat fixed to the upper rail 101 is placed in an unlocked state so that it becomes movable in the frontward-rearward direction.

In this state, the seated person or operator can move the seat to a desired position simply by applying force to the seat in the frontward or rearward direction.

When the upper rail 101 is slidingly moved with respect to the lower rail 102, if a foreign object 10, such as a candy or a block, intrudes in the lower rail 102 through the upper opening 102f of the lower rail 102, the foreign object 10 is placed on the elastic body 2, as illustrated in FIGS. 3 and 5. Thus, during the sliding movement of the upper rail 101 with respect to the lower rail 102, an end face of the upper rail 101 or the unlock operating member 202 pushes the foreign object 10.

The pushed foreign object 10 is slidingly displaced on the elastic body 2 of the foreign-object catching member 1. The height of the elastic body 2 is higher than that of the head 105a of the positioning pin 105, as mentioned above. Thus, it becomes possible to prevent the foreign object 10 from being stopped by hitting against the head 105a of the positioning pin 105 during the sliding movement of the upper rail 101. This makes it possible to reduce a risk that the foreign object 10 is pinched between the head 105a of the positioning pin 105 and the end face of the upper rail 101 or the unlock operating member 202, and broken into pieces.

In addition, the elastic body 2 is disposed to restrict access to the interspace 5 of the lower rail 102, so that it becomes possible to reduce a risk that the foreign object 10 intruding in the lower rail 102 through the upper opening 102f enters a space between the inner wall 102c and the sidewall 102a of the lower rail 102 through the gap G (see FIG. 5).

In an operation for placing the seat in a locked state, the operator releases his/her hand from the grip portion 227 of the unlock operating member 202. Thus, the holding piece 233b is moved upwardly by to the biasing force of the biasing piece 233a of the first arm 233 of the plate spring 203 and the elastic force of the elastic body 2 of the foreign-object catching member 1, and the lockable member 201 held by the holding piece 233b is swingingly moved toward the locking teeth 102d, so that the locking teeth 102d are inserted into respective ones of the lockable holes 212 to establish the locked state illustrated in FIG. 9.

In this process, the lockable member 201 can be biased upwardly by the biasing force of the plate spring 203 and the elastic force of the elastic body 2, and set in the locked position, so that it becomes possible to reliably establish the locked state between the lockable member 201 and the locking teeth 102d.

Thus, the upper rail 101 is precluded from being slidingly moved along the lower rail 102, and the seat fixed to the upper rail 101 is placed in a locked state so that it becomes immovable in the frontward-rearward direction. According to the biasing force of the first arm 233 of the plate spring 203, the member body 221 of the unlock operating member 202 is swingingly moved in a counterclockwise direction in FIG. 7, and returned to the position illustrated in FIG. 7.

In the above embodiment, the foreign-object catching member 1 is disposed between the positioning pins. However, the present invention is not limited to such an arrangement, but the embodiment may be appropriately changed and modified. For example, in cases where a height of each of the fixing bolts with respect to the bottom wall is higher than that of each of the positioning pins, or the fixing member consists only of the fixing bolts without the positioning pins, the height of the elastic body with respect to the bottom wall may be set to become higher than that of the fixing bolt, and the foreign-object catching member may be disposed between the fixing bolts.

Figure 12:
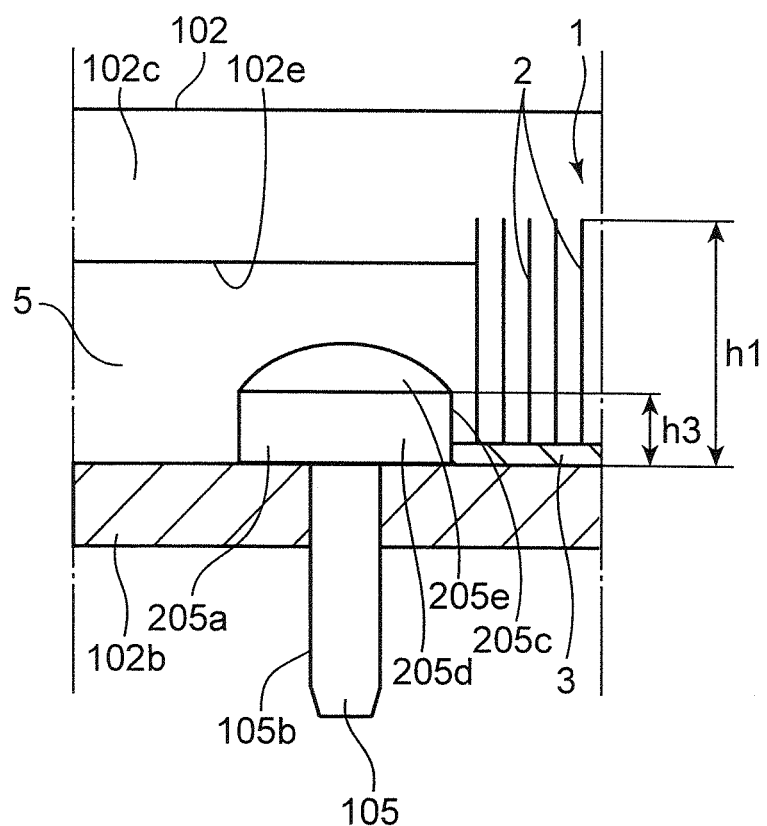
FIG. 12 is a side view of yet another embodiment of the seat slide device.

In the above embodiment, the head of the positioning pin consisting of a columnar body is considered as a protruding object. Alternatively, for example as illustrated in FIG. 12, the positioning pin 105 may have a head 205a which comprises a head body 205d composed of a columnar body having a vertical surface 205c, and a curved taper portion 205e locate on the side of a distal end (upper end) of the head body 205d and formed to have a diameter which gradually decreases toward a distal end thereof.

In cases where the positioning pin 105 having the above head 205a is used, when a foreign object falls on the elastic body 2 during the sliding movement of the upper rail, it is pushed by the upper rail and displaced on the elastic body 2. During this displacement, if the foreign object hits against the vertical surface 205c of the head body 205d, the displacement is precluded. However, even if the foreign object hits against the taper portion 205e, it can be slidingly displaced along the taper portion 205e, so that the displacement is less likely to be precluded.

Thus, in the use of this type of positioning pin 105, a height h1 of the elastic body 2 with respect to the bottom wall 102b of the lower rail 102 is set to become approximately equal to or higher than a height h3 of the vertical surface 205c of the head body 205d of the positioning pin 105. This makes it possible to prevent a foreign object from hitting against the positioning pin 105 and becoming precluded from the displacement.

Figure 13:
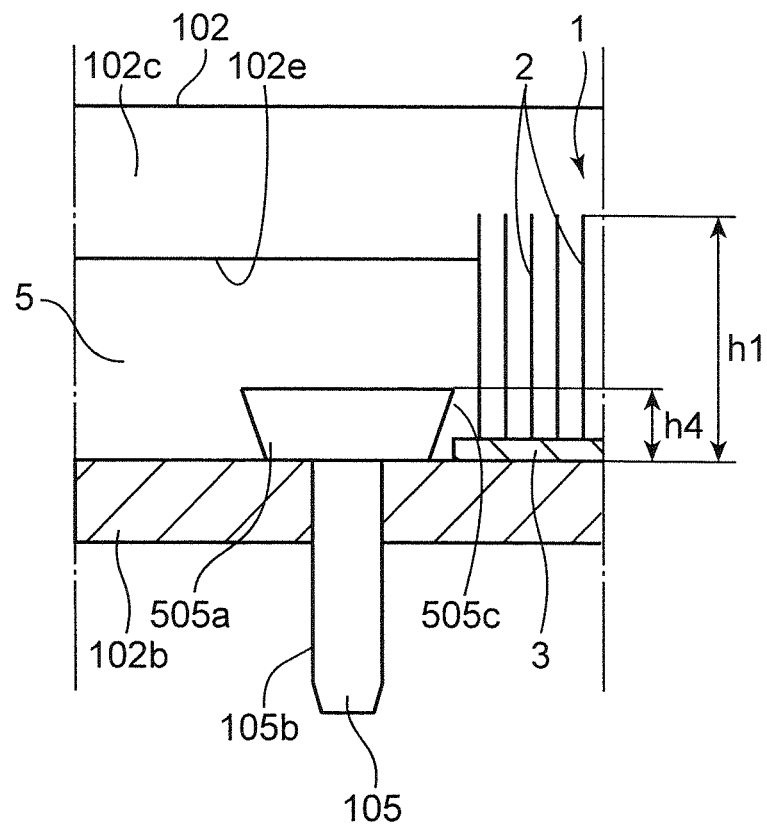
FIG. 13 is a side view of yet another embodiment of the seat slide device.
Figure 14B:
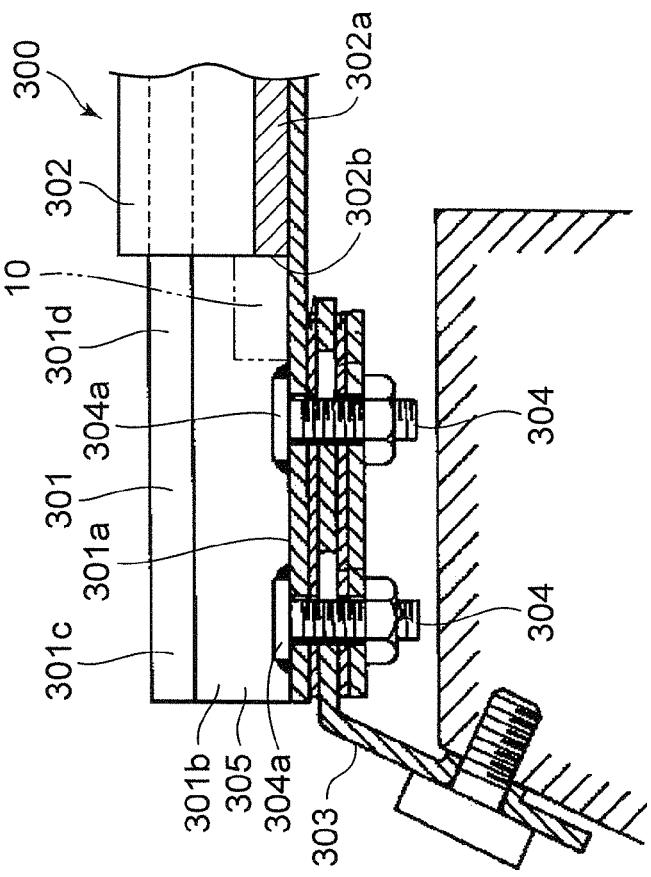
FIG. 14B is a fragmentary sectional view of the conventional seat slide device in a state after it is mounted on a floor.
Figure 14A:
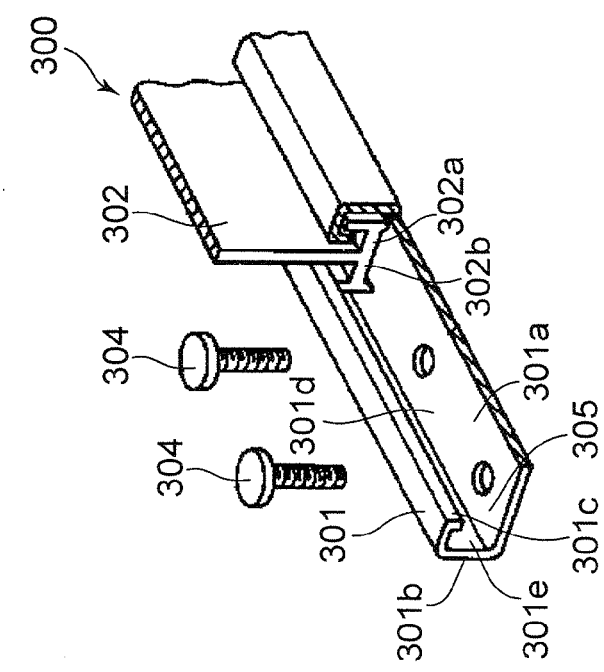
FIG. 14A is a fragmentary perspective view of an example of a conventional seat slide device.

Further, the head of the positioning pin 105 is not limited to a shape having a vertical surface. For example, as illustrated in FIG. 13, the positioning pin 105 may have a head 505a with a taper outer peripheral surface 505c having a diameter which gradually increases toward a distal end thereof.

In this case, when a foreign object falls on the elastic body 2 during the sliding movement of the upper rail, it is pushed by the upper rail and displaced on the elastic body 2. During this displacement, if the foreign object hits against the taper surface 505c, the displacement is precluded. Thus, the height h1 of the elastic body 2 with respect to the bottom wall 102b of the lower rail may be set to become approximately equal to or higher than a height h4 of the taper surface 505c of the positioning pin 105. In the positioning pin 105 having the head 505a with the taper surface 505c, the taper portion illustrated in FIG. 12 may be additionally provided on the taper surface 505c.

In the above embodiment, a part of the fixing member consisting of the fixing bolts and the positioning pins is considered as a protruding object higher than the bottom wall within the lower rail. However, the protruding object in the present invention is not limited to a part of the fixing member. For example, when a part of the upper rail 101 is cut and raised to form a hole therein as illustrated in FIG. 9, and the cut-and-raised piece 106 is raised toward an inside of the lower rail 102, the cut-and-raised piece 106 may be considered as the protruding object. In this case, the height of the elastic body with respect to the bottom wall may be set to become equal to or higher than a height of the cut-and-raised piece 106 with respect to the bottom wall.

Figure 11:
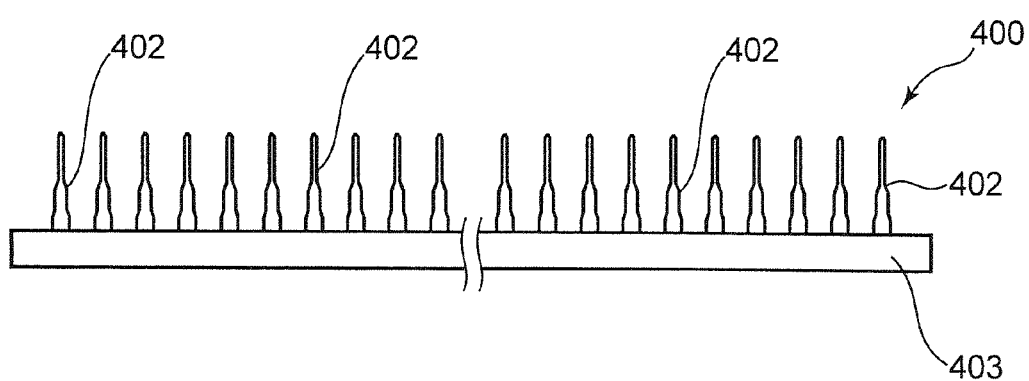
FIG. 11 is a side view of another embodiment of the seat slide device.

In the above embodiment, the elastic body of the foreign-object catching member comprises a plurality of elements each having the same diameter in an overall length from a lower end to an upper end thereof. Alternatively, as illustrated in FIG. 11, an elastic body 402 of a foreign-object catching member 400 may comprise a plurality of elements attached to a retainer portion 403 and each formed to have a diameter which gradually decreases in a direction from a lower end to an upper end thereof. The elastic member 402 may be appropriately modified, for example, to a pleat configuration.

As described above, the present invention provides a seat slide device which comprises a long-shaped lower rail (102) formed to have an upper opening and fixed to a floor of a vehicle, and an upper rail (101) attached to a seat and adapted to be slidingly moved along the lower rail. The lower rail has a bottom wall (102b) formed in a generally planar shape over an overall length thereof, and includes a foreign-object catching member (1) provided on an upper surface of the bottom wall and adapted to catch a foreign object which falls inside the lower rail through the upper opening (102f). The foreign-object catching member has an elastic body (2). The elastic body (2) is adapted, during the slide movement of the upper rail (101), to allow a foreign object caught by the elastic body (2) to be pushed by the upper rail (101) and displaced together with the upper rail, while preventing the foreign object from being stopped by hitting against a protruding object (105, 106) protrudingly provided inside the lower rail during the slide movement of the upper rail (101).

In the seat slide device as mentioned above, for example, if a foreign object, such as a candy or a block, intrudes in the lower rail through the upper opening (102f), the foreign object is placed on the elastic body of the foreign-object catching member (2). Then, when the upper rail (101) is slidingly moved along the lower rail (102), the foreign object is pushed by the upper rail and displaced in a longitudinal direction of the lower rail together with the upper rail. The elastic body (2) is adapted, during the slide movement of the upper rail, to prevent the foreign object from hitting against a protruding object (105, 106) protrudingly provided inside the lower rail during the displacement and becoming precluded from the displacement. This makes it possible to eject the foreign object from a longitudinal end of the lower rail to an outside of the lower rail so as to prevent the foreign object from being pinched between the protruding object (105, 106) and the upper rail (101) and broken into pieces.

In the preferable structure of the invention as described above, the bottom wall has longitudinally opposite ends each positioned and fixed to the floor by a fixing member (105) having a head (105a, 205a), wherein the head of the fixing member is disposed to protrude from the upper surface of the bottom wall (102b), and formed to have a vertical surface approximately perpendicular to the upper surface of the bottom wall (102b), and wherein the protruding object (105) includes the head (105a, 205a), and a height (h1) of the elastic body (2) with respect to the upper surface of the bottom wall (102b) is set to be equal to or higher than a height (h2, h3) of the vertical surface of the head (105a, 205a) with respect to the upper surface of the bottom wall (102b).

With the above features, it becomes possible to prevent a foreign object from being stopped by hitting against the vertical surface of the head (105a, 205a) of the fixing member during the sliding movement of the upper rail. This makes it possible to eject the foreign object from the longitudinal end of the lower rail (102) to the outside of the lower rail so as to prevent the foreign object from being pinched between the protruding object (105a, 205a) and the upper rail (101) and broken into pieces.

In another preferable example of the present invention, the foreign-object catching member has a plate-shaped retainer portion (3) retaining the elastic body (2), wherein the retainer portion is fixed to the bottom wall under a condition that a first surface of the retainer portion is placed on the upper surface of the bottom wall (102b), and wherein the elastic body (2) comprises a plurality of hair-like protruding pieces, wherein the protruding pieces is provided on a second surface of the retainer portion to extend from the bottom surface toward the upper opening (102f) when the retainer portion (3) is fixed to the bottom wall (102b).

With the above features, the foreign-object catching member can be installed inside the lower rail simply by fixing the first surface of the retainer portion of the foreign-object catching member to the bottom wall, which makes it possible to facilitate the installation.

In yet another example of the present invention, the lower rail has a pair of sidewalls (102a) each extending upwardly from a respective one of widthwisely opposite ends of the bottom wall, and a pair of bended pieces (102c, 301c) each bended inwardly and downwardly from an upper end of a respective one of the sidewalls, wherein each of the bended pieces is formed such that an interspace (5) for allowing a portion of the upper rail to movably pass therethrough is defined between a distal end (102e) of the bended piece and the bottom wall (102b), and wherein the elastic body (2) is disposed to narrow a gap (G) between the elastic body and the distal end (102e) so that an access of the foreign object to the interspace (5) is restricted.

With the above features, it becomes possible to reduce a risk that a foreign object intruding in the lower rail from the upper opening (102f) enters a space between the sidewall (102a) and the bended piece (102c) through the gap (G) defined by the top side edge of the elastic body (2) and the distal end (102e) of the bended piece (102c), so as to allow the foreign object to become less likely to hinder smooth sliding movement of the upper rail.

Preferably, in the above embodiment, each of the bended pieces (12c) has a plurality of locking teeth (102d) at the distal end thereof, and the upper rail (101) is provided with a lockable member (201) adapted to be releasably locked by the locking teeth, and an unlock operating member (202) for manually releasing the lock between the lockable member (201) and the locking teeth (102d), wherein the lockable member (201) is adapted to be movable in an upward-downward direction in a range from a locked position where it is locked by the locking teeth (102d) to an unlocked position located below the locked position, and disposed inside the upper rail while being biased upwardly by an elastic force by the elastic body, and the unlock operating member (202) is adapted to allow a user to manually push the lockable member (201) in the locked position downwardly against the elastic force so as to move the lockable member to the unlocked position.

With the above features, the lockable member can be biased upwardly to the locked position by an elastic force of the elastic member, so that it becomes possible to reliably establish a locked state between the lockable member and the locking teeth. Further, in an unlocking operation, the locked state can be smoothly released by manually pressing the lockable member downwardly against the elastic force.

This application is based on Japanese Patent Application Serial No. 2010-278007 and Serial No. 2011-134766, filed in Japan Patent Office on Dec. 14, 2010 and Jun. 17, 2011, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat slide device comprising:
a long-shaped lower rail having an upper opening and configured to be fixed to a floor of a vehicle; and
an upper rail configured to be attached to a seat, and slidingly movable along the lower rail,
the lower rail having:
a bottom wall formed in a generally planar shape over an overall length thereof, the bottom wall having an upper surface and opposite sides,
a protruding object protruding from the upper surface of the bottom wall,
first and second opposite sidewalls extending up respectively from the opposite sides of the bottom wall, the opposite side walls being formed respectively with upper ends,
opposite bended portions extending in and down respectively from the upper ends of the first and second opposite sidewalls, the opposite bended portions being formed respectively with lower distal ends, the pair of opposite bended portions defining the upper opening and a space for accommodating the protruding object protruding from the upper surface of the bottom wall, and
a foreign-object catching member provided on the upper surface of the bottom wall to catch a foreign object that falls inside the lower rail through the upper opening, the foreign-object catching member having an elastic body which:
is disposed between the opposite bended portions; and
has an upper end lying at a position higher than the lower distal ends formed respectively on the opposite bended portions so that the elastic body, during the slide movement of the upper rail, allows a foreign object caught by the elastic body to be pushed by the upper rail and moved together with the upper rail, while preventing the foreign object from being stopped by hitting against the protruding object.

2. The seat slide device according to claim 1, wherein the bottom wall has longitudinally opposite ends and is to be positioned and fixed to the floor by a fixing member having a head,
the head of the fixing member being disposed to protrude from the upper surface of the bottom wall, and having a vertical surface approximately perpendicular to the upper surface of the bottom wall, wherein
the head is the protruding object; and
a height of the elastic body with respect to the upper surface of the bottom wall is set to be equal to or higher than a height of the vertical surface of the head with respect to the upper surface of the bottom wall.

3. A seat slide device, comprising:
a long-shaped lower rail having an upper opening, and configured to be fixed to a floor of a vehicle; and
an upper rail configured to be attached to a seat and slidingly moveable along the lower rail,
the lower rail having:
a bottom wall formed in a generally planar shape over an overall length thereof, and
a foreign-object catching member provided on an upper surface of the bottom wall to catch a foreign object which falls inside the lower rail through the upper opening,
the foreign-object catching member having an elastic body,
the elastic body, during the slide movement of the upper rail, allows a foreign object caught by the elastic body to be pushed by the upper rail and moved together with the upper rail, while preventing the foreign object from being stopped by hitting against a protruding object protruding from the upper surface of the bottom wall,
wherein:
the foreign-object catching member has a plate-shaped retainer portion retaining the elastic body,
the retainer portion is fixed to the bottom wall under a condition that a first surface of the retainer portion is placed on the upper surface of the bottom wall, the elastic body has hair-like protruding pieces, and
the hair-like protruding pieces are provided on a second surface of the retainer portion to extend from the bottom surface toward the upper opening when the retainer portion is fixed to the bottom wall.

4. The seat slide device according to claim 1, wherein the space allows a portion of the upper rail to movably pass between the lower distal ends formed respectively on the opposite bended portions and the bottom wall, and
wherein the elastic body is disposed to narrow a gap between the elastic body and the lower distal ends so that an access of the foreign object to the space is restricted.

5. The seat slide device according to claim 2, wherein the space allows a portion of the upper rail to movably pass between the lower distal ends formed respectively on the opposite bended portions and the bottom wall, and
wherein the elastic body is disposed to narrow a gap between the elastic body and the lower distal ends so that an access of the foreign object to the space is restricted.

6. The seat slide device according to claim 3, wherein the bottom wall of the lower rail has opposite sides, and wherein the lower rail has
opposite sidewalls extending upwardly from opposite sides of the bottom wall, the opposite side walls being formed respectively with upper ends, and
opposite bended portions extending inwardly and downwardly from the upper ends of the respective opposite sidewalls,
the opposite bended portions defining the upper opening and a space for allowing a portion of the upper rail to movably pass between distal ends of the opposite bended portions and the bottom wall, and
wherein the elastic body is disposed to narrow a gap between the elastic body and the distal ends so that an access of the foreign object to the space is restricted.

7. The seat slide device according to claim 4, wherein:
each of the opposite bended portions has a plurality of locking teeth at the lower distal end thereof; and
the upper rail is provided with:
a lockable member adapted to be releasably locked by the locking teeth, and
an unlock operating member for manually releasing the lockable member from the locking teeth,
the lockable member is adapted to be movable in an upward-downward direction in a range from a locked position where the lockable member is locked by the locking teeth to an unlocked position located below the locked position, and disposed inside the upper rail while being biased upwardly by an elastic force by the elastic body; and
the unlock operating member is adapted to allow a user to manually push the lockable member in the locked position downwardly against the elastic force so as to move the lockable member to the unlocked position.

8. The seat slide device according to claim 5, wherein:
each of the opposite bended portions has a plurality of locking teeth at the lower distal end thereof; and
the upper rail is provided with:
a lockable member adapted to be releasably locked by the locking teeth, and
an unlock operating member for manually releasing the lockable member from the locking teeth,
the lockable member is adapted to be movable in an upward-downward direction in a range from a locked position where the lockable member is locked by the locking teeth to an unlocked position located below the locked position, and disposed inside the upper rail while being biased upwardly by an elastic force by the elastic body; and
the unlock operating member is adapted to allow a user to manually push the lockable member in the locked position downwardly against the elastic force so as to move the lockable member to the unlocked position.

9. The seat slide device according to claim 6, wherein:
each of the opposite bended portions has a plurality of locking teeth at the lower distal end thereof; and
the upper rail is provide with:
a lockable member adapted to be releasably locked by the locking teeth, and
an unlock operating member for manually releasing the lockable member from the locking teeth,
the lockable member is adapted to be movable in an upward-downward direction in a range from a locked position where the lockable member is locked by the locking teeth to an unlocked position located below the locked position, and disposed inside the upper rail while being biased upwardly by an elastic force by the elastic body; and
the unlock operating member is adapted to allow a user to manually push the lockable member in the locked position downwardly against the elastic force so as to move the lockable member to the unlocked position.

10. The seat slide device according to claim 3, wherein:
the protruding object is a head of a fixing member,
the bottom wall has longitudinally opposite ends and is to be positioned and fixed to the floor by the fixing member,
the head of the fixing member being disposed to protrude from the upper surface of the bottom wall, and having a vertical surface approximately perpendicular to the upper surface of the bottom wall, wherein
a height of the elastic body with respect to the upper surface of the bottom wall is set to be equal to or higher than a height of the vertical surface of the head with respect to the upper surface of the bottom wall.

\* \* \* \* \*